(12) United States Patent
Gonia et al.

(10) Patent No.: US 7,603,129 B2
(45) Date of Patent: Oct. 13, 2009

(54) LOCALIZATION IDENTIFICATION SYSTEM FOR WIRELESS DEVICES

(75) Inventors: Patrick S. Gonia, Maplewood, MN (US); Vinayak S. Kore, Bangalor (IN); Arun V. Mahasenan, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 526 days.

(21) Appl. No.: 11/163,105

(22) Filed: Oct. 5, 2005

(65) Prior Publication Data

US 2007/0077941 A1    Apr. 5, 2007

(51) Int. Cl.
*G06F 15/16* (2006.01)
(52) U.S. Cl. .................... 455/456.1; 375/214
(58) Field of Classification Search ........... 455/456.1, 455/456.2, 456.3; 375/214, 278, 340
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |
| 3,758,885 A | 9/1973 | Voorman et al. | |
| 4,264,874 A | 4/1981 | Young | |
| 4,529,947 A | 7/1985 | Biard et al. | |
| 4,614,945 A | 9/1986 | Brunius et al. | |
| 4,667,191 A * | 5/1987 | Comroe et al. ............ | 370/455 |
| 4,812,785 A | 3/1989 | Pauker | |
| 4,843,638 A | 6/1989 | Walters | |
| 5,392,003 A | 2/1995 | Nag et al. | |
| 5,428,602 A | 6/1995 | Kemppainen | |
| 5,428,637 A | 6/1995 | Oliva, Jr. et al. | |
| 5,430,409 A | 7/1995 | Buck et al. | |
| 5,438,329 A | 8/1995 | Gastouniotis et al. | |
| 5,451,898 A | 9/1995 | Johnson | |

(Continued)

FOREIGN PATENT DOCUMENTS

CH            673184            2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—Sam Bhattacharya
(74) *Attorney, Agent, or Firm*—Kris T. Fredrick

(57) ABSTRACT

Wireless devices, systems and approaches or methods having the capability of determining the location of a given wireless device. An example system includes a wireless device that generates at least one pulse as a part of an output signal, and the at least one pulse is captured by anchor devices and used, in a time of arrival approach, to determine the location of the example device. The at least one pulse may be generated during a designated portion of an otherwise normally modulated message. Another example system includes an anchor node that generates a directional output signal, the direction output signal including data indicating its direction, and the directions of output signals from plural anchor nodes when pointed at a wireless device are used to determine the location of the wireless device. Combinations of the pulse and directional antenna systems, devices used within each of these systems, and approaches associated with these systems are also included.

26 Claims, 10 Drawing Sheets

U.S. PATENT DOCUMENTS

| | | | |
|---|---|---|---|
| 5,481,259 | A | 1/1996 | Bane |
| 5,642,071 | A | 6/1997 | Sevenhans et al. |
| 5,659,303 | A | 8/1997 | Adair, Jr. |
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 6,052,600 | A | 4/2000 | Fette et al. |
| 6,058,137 | A | 5/2000 | Partyka |
| 6,084,927 | A * | 7/2000 | Pon .......................... 375/343 |
| 6,091,715 | A | 7/2000 | Vucetic et al. |
| 6,133,876 | A * | 10/2000 | Fullerton et al. ............ 342/375 |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 | 5/2005 | Helgeson |
| 2002/0011923 | A1 | 1/2002 | Cunningham et al. |
| 2002/0085622 | A1 | 7/2002 | Dhar et al. |
| 2002/0118655 | A1 | 8/2002 | Harrington et al. |
| 2002/0141479 | A1 | 10/2002 | Garcia-Luna-Aceves et al. |
| 2003/0053555 | A1 | 3/2003 | McCorkle et al. |
| 2003/0198280 | A1 | 10/2003 | Wang et al. |
| 2004/0108954 | A1 | 6/2004 | Richley et al. |
| 2004/0253996 | A1 | 12/2004 | Chen et al. |
| 2005/0281215 | A1 | 12/2005 | Budampati et al. |

FOREIGN PATENT DOCUMENTS

| | | |
|---|---|---|
| DE | 4344172 | 6/1995 |
| EP | 0607562 | 7/1994 |
| EP | 0893931 | 1/1999 |
| WO | 9934230 | 7/1999 |
| WO | WO 00/70572 | 11/2000 |
| WO | 03036934 | 5/2003 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bamboweb.com/articles/o/s/OSI_model.html, "Bambooweb OSI model," Bambooweb Dictionary, 5 pages, printed May 23, 2005.

http://www.dailywireless.org/modules.php?name=News&file=article&sid=871, "Location By Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1345, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Font-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp.1944-1950, Dec. 1991.

* cited by examiner $\cot(a_1) = m/n \qquad \cot(a_3) = (y-m)/n = y/n - m/n$ $\cot(a_1) + \cot(a_3) = m/n + y/n - m/n = y/n$ $n = y/[\cot(a_1) + \cot(a_3)]$ $m = n/\tan(a_1)$

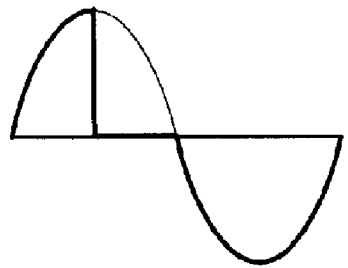
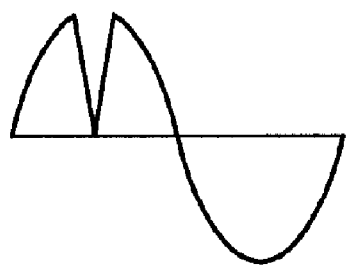
*FIG. 6A*  *FIG. 6B*
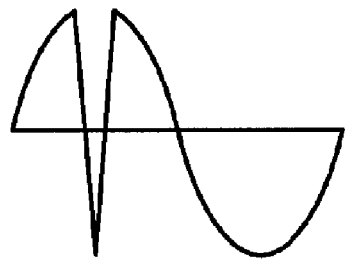
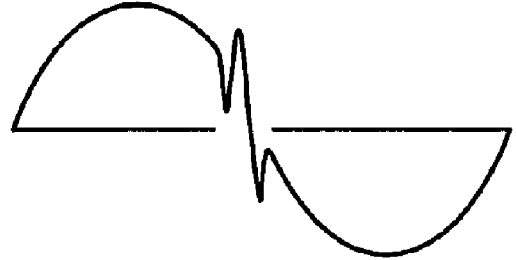
*FIG. 6C*  *FIG. 6D*
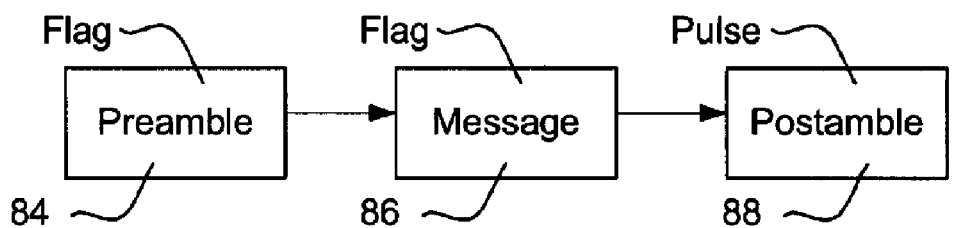
*FIG. 7*

LOCALIZATION IDENTIFICATION SYSTEM FOR WIRELESS DEVICES

The present application is related to copending and commonly assigned U.S. patent application Ser. No. 11/163,099, entitled LOCALIZATION FOR LOW COST SENSOR NETWORK, filed on Oct. 5, 2005.

BACKGROUND

The present invention is related to the field of wireless networks. More specifically, the present invention relates to efforts to determine the location of devices within a wireless network.

Wireless networks may be used in a number of contexts. One type of wireless network includes at least one base node and a number of distributed nodes. The distributed nodes may be used, for example, to capture and send data to the base node(s). In some such systems, the distributed nodes relay sensor information captured at the distributed nodes, if the distributed nodes are themselves sensors, or sensor information gathered from sensor nodes in communication with the distributed nodes. Approaches for localizing individual nodes in a wireless network are desired, for example, such that the origin of data collected at individual nodes may be identified, and/or such that internodal communications can be mapped in an efficient manner.

SUMMARY

An illustrative example system includes a wireless device that generates a pulse as a part of an output signal. In the illustrative example, the pulse is captured by anchor devices having known locations and used, in a time of arrival approach, to determine the location of the example device. Another illustrative example system includes an anchor node that generates a directional output signal, the direction output signal including data indicating its direction, and the directions of output signals from plural anchor nodes when pointed at a wireless device are used to determine the location of the wireless device. Combinations of the pulse and directional antenna systems, devices used within each of these systems, and approaches or methods associated with these systems are also included.

BRIEF DESCRIPTION OF THE DRAWING

FIGS. 6A-6D are graphic representations of a node-generated signals used in some illustrative examples;

FIG. 7 is a block diagram for a communication in an illustrative example;

DESCRIPTION

Figure 1:
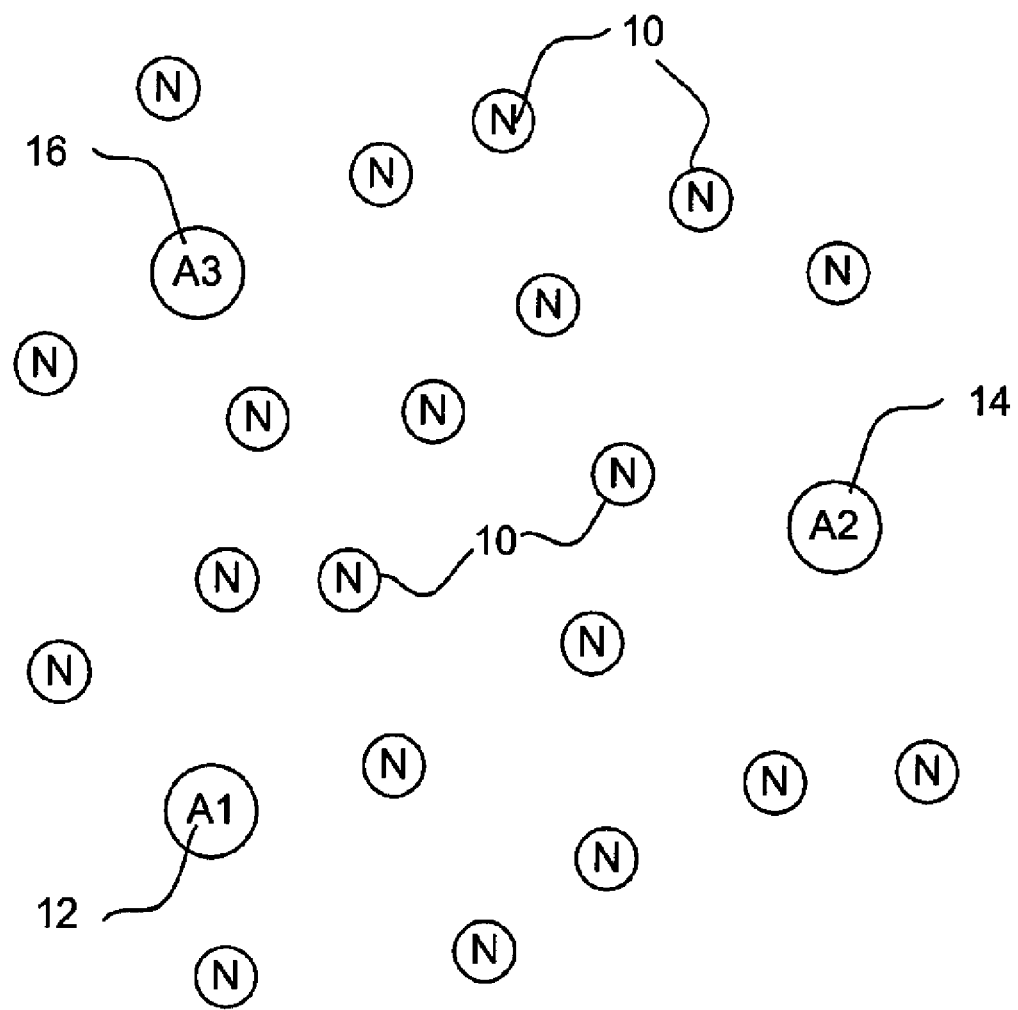
FIG. 1 is a diagram of a wireless system.

FIG. 1 is a diagram of a wireless system. The system includes a number of distributed nodes 10 and a number of anchor nodes 12, 14, 16. The anchor nodes 12, 14, 16 provide points of reference for indicating where the distributed nodes 10 are located. For instance, in some examples the anchor nodes 12, 14, 16 may include GPS components for determining global position. In other examples, the "global" location is less relevant than relative position, for example, among the distributed nodes 10 and anchor nodes 12, 14, 16. It should be noted that only a portion of an illustrative system is shown; an example system may be of any size and may include any number of devices.

In an illustrative example, the system may define one or more coordinate systems based upon the locations of the anchor nodes 12, 14, 16. For instance, the position of anchor node A1 12 may be chosen as a point of origin for a coordinate system used to define the system, with the location of other devices in the system defined with respect to this coordinate system. Such a coordinate system may be chosen arbitrarily for the purposes of providing a reference coordinate system for defining locations.

In some instances, some or all of the distributed nodes 10 may be leaf nodes and some or all of the anchor nodes 12, 14, 16 may be infrastructure nodes as defined in copending U.S. patent application Ser. No. 10/870,295, entitled WIRELESS COMMUNICATION SYSTEM WITH CHANNEL HOPPING AND REDUNDANT CONNECTIVITY, the disclosure of which is incorporated herein by reference. The distributed nodes 10 are, in some examples, energy constrained devices operating with limited capacity power supplies, such as batteries. In some instances, some or all of the distributed nodes 10 may be reduced function devices, and some or all of the anchor nodes 12, 14, 16 may be full function devices, in accordance with how those terms are used by those skilled in the art. Some or all of the nodes in the system may also operate according to other communication protocols such as Bluetooth®, Zigbee® or various IEEE® 802.11 protocols, for example, as well as being adapted to operating using a number of such protocols.

Figure 2:
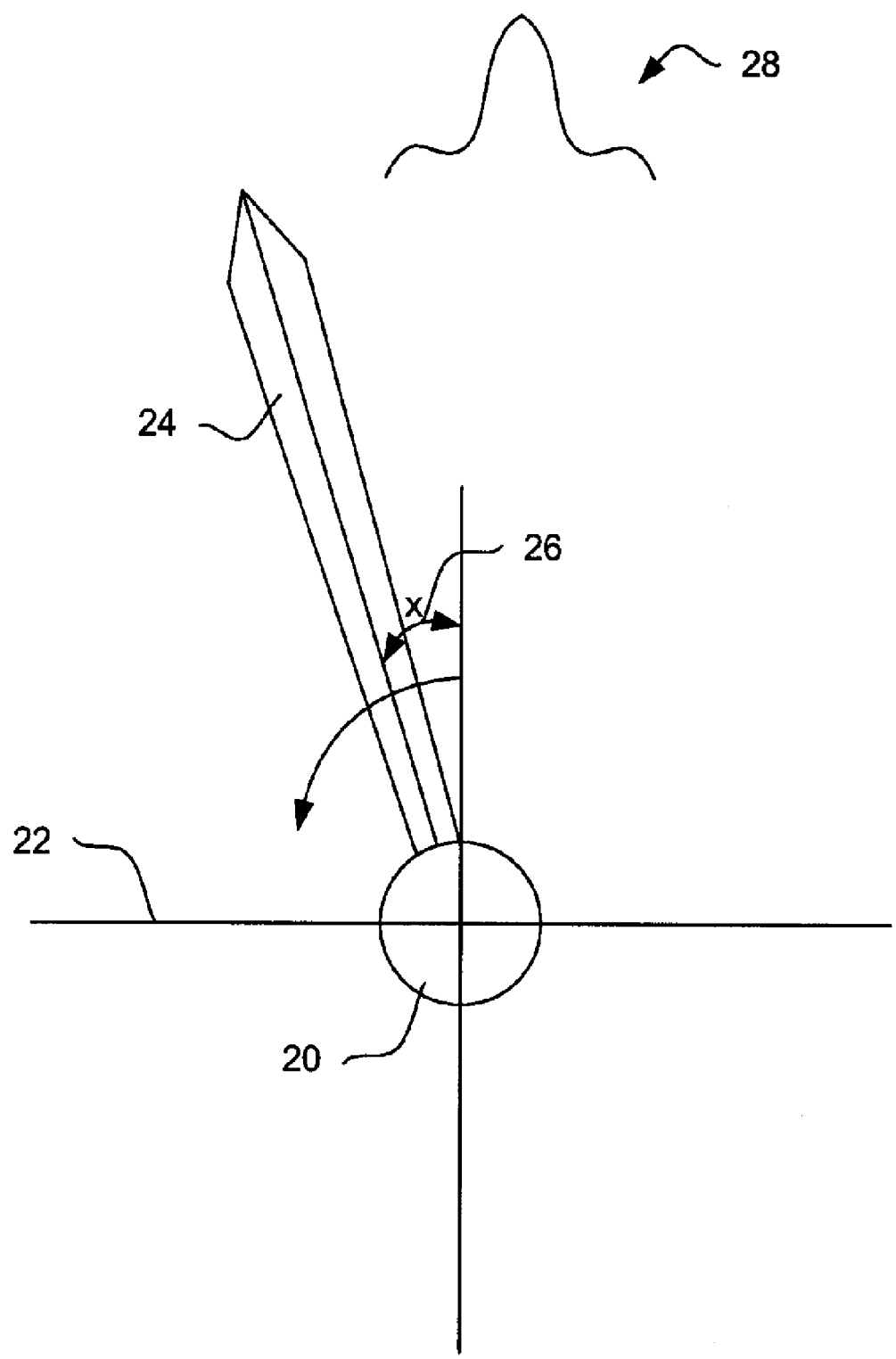
FIG. 2 illustrates an anchor node capable of producing a directed wireless output signal.

FIG. 2 illustrates an anchor node capable of producing a directed wireless output signal or beacon. The illustrative anchor node 20 is shown relative to an arbitrary coordinate system 22. The illustrative anchor node 20 is adapted to produce a beacon, shown at 24, having directional characteristics. In an illustrative example, the beacon 24 can be moved or rotated by the illustrative anchor node 20 with respect to the coordinate system 22. In some instances, the movement may be effected by a mechanical device. In other instances, a phased array antenna is used to cause movement of the beacon 24 without corresponding mechanical motion.

In an illustrative example, the beacon 24 includes data packets that indicate the angle x, shown at 26, of the beacon 24 with respect to the coordinate system 22 at the time each data packet is produced. The beacon data packets may also include location information for the anchor node 20 generating the beacon 24. Thus, for example, at a first time a first data packet can be generated and sent as part of the beacon 24, with the first data packet indicating an angle x between the beacon 24 and a reference line at the time the first packet is sent, as well as data for the location of the anchor node 20 that produces the beacon 24. At another time, a second data packet can be generated and sent as part of the beacon 24. The second data packet may indicate another angle, not equal to x, between the beacon 24 and the reference line at the time the second packet is sent, as well as location information for the anchor node 20.

As shown at 28, the beacon 24 may have an intensity profile that varies with position. For most directional antennae, there will be a center lobe or peak in the beacon where signal strength will be greatest, and side peaks (not shown) may also appear. The signal strength profile 28 may be used to determine when the directional antenna is directed at a target, by observing when the peak intensity occurs.

Figure 3:
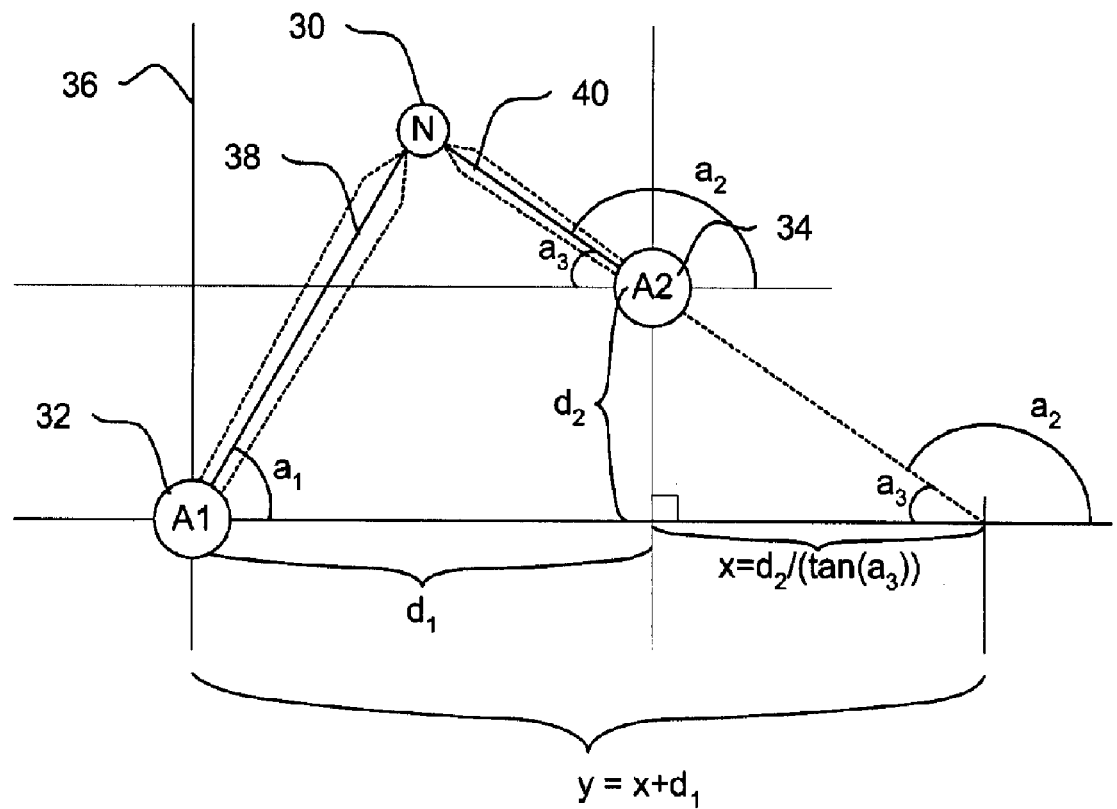
FIG. 3 is a geometric representation of an illustrative example.

FIG. 3 is a geometric representation of an illustrative example. The location of node 30 can be determined using a first anchor node 32 and a second anchor node 34. A coordinate system 36 is shown for illustrative purposes with first anchor node 32 located at (0,0), and second anchor node 34 located at (d1, d2). Two distances d1 and d2 define the relative locations of the first anchor node 32 and the second anchor node 34. Using a directed signal as shown in FIG. 2, the angle of transmission when node 30 is within the main lobe of each beacon can be found, since the angle and location of transmission is included in data packets that form part of the beacons 38, 40 from the anchor nodes 32, 34. As such, angles a1 and a2 can be defined, both with reference to the arbitrary coordinate system 36. Angle a3 is also defined, a3 being the supplement of a2. Extending a line from the node 30 beyond the second anchor node 34, as shown, allows a distance, y, to be defined along a coordinate axis, as shown. The distance, y, is then found by adding a quantity, x, to d1. The quantity, x, may be found using the formula shown.

Figure 4:
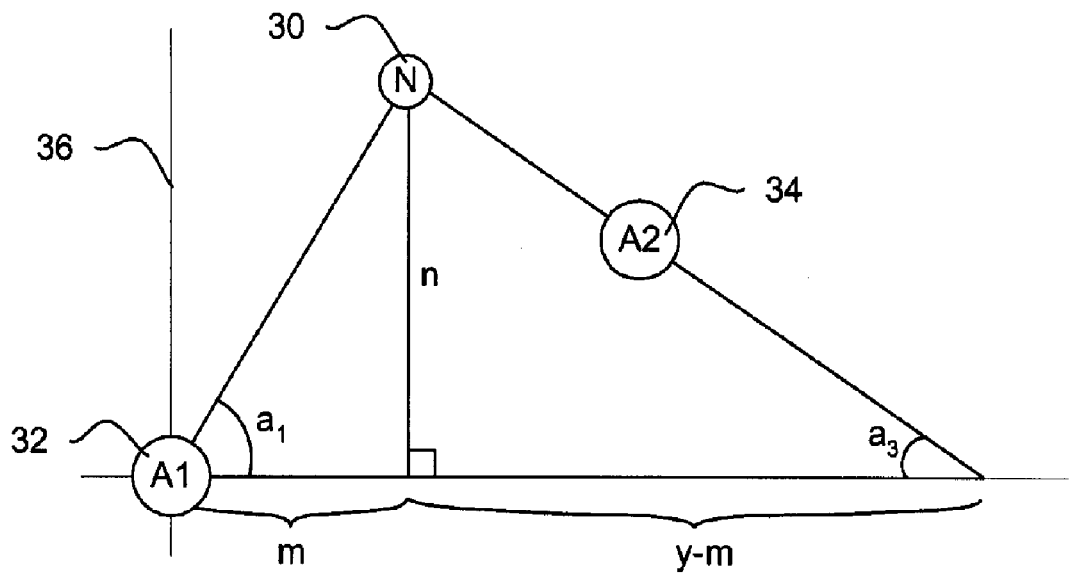
FIG. 4 shows how a node location may be determined in an illustrative example.

Turning to FIG. 4, a perpendicular from node 30 can be dropped and a distance m defined as shown. Using cotangents, distances m and n can be defined, again using the coordinate system 36, to determine the location of the node 30 in the coordinate system 36.

The example analysis of FIGS. 3 and 4 is merely illustrative of one geometric approach that can work to determine the location of node 30 with respect to the anchor nodes 32, 34. It may be understood that another anchor node may be added to the illustrative example such that localization in a three-dimensional sense can be performed as well.

In a more generalized approach, a first anchor node A1 may be at location (x1, y1), and a second anchor node A2 may be at location (x2, y2). The two anchor nodes may generate a directional signal along a 360-degree sweep, for example, such that all the distributed nodes covered in the network become aware of their angular bearing with respect to the known reference points of the two anchor nodes. For an arbitrary node at location (x, y), anchor node A1 may indicate an angle $\theta 1$ from its location at x1, y1. With respect to anchor node A1, the distributed node may infer its location as a straight line passing through (x1, y1) having a slope of tan ($\theta 1$). The resulting formula is:

$$y - y1 = (x - x1) * \tan(\theta 1)$$

Similarly, from anchor node A2, the distributed node receives angle $\theta 2$ as well as data indicating the position of anchor node A2 at (x2, y2). Again, the distributed node may infer its location along a straight line passing through (x2, y2) having a slope of tan($\theta 2$). The resulting formula is:

$$y - y2 = (x - x2) * \tan(\theta 2)$$

Using these equations and solving for x gives:

$$x = (y2 - y1 - x2 * \tan(\theta 2) + x1 * \tan(\theta 1)) / (\tan(\theta 1) - \tan(\theta 2))$$

The value calculated from this formula for x can then be used to determine y from either of the other formulas. Once the distributed nodes have determined their own positions, this data may be sent to a central controller, gateway node or other destination. The introduction of redundant anchor nodes may increase the robustness of the localization approach as well as introducing a higher likelihood of greater accuracy. Alternatively, the distributed nodes may communicate the received location data to a central processing node that determines the location (for example, using an arbitrary coordinate system) of each node in the network.

In further examples, localization in a third dimension may be performed. Localization in two dimensions basically uses a narrow pencil beacon with very low azimuth and elevation angle. The beacon, in two dimensions, may be equivalent to a line if the beacon width is very low. Two such beacons may be used for localization in two dimensions, with the located point being the point of intersection of the two beacons, since two lines intersect at a point. From a signal generation perspective, for example using phased-array antennae, this beacon can be generated by using a n*m grid of antenna elements where n and m are greater than 1.

Localization in three dimensions may instead use a "fan" beacon, which may be a beacon that is more or less a plane. Such a beacon may have either a very high azimuth angle and a low elevation angle, or a very high elevation angle and a very low azimuth angle. At least three such "fan" beacons may be used for three dimensional localization, with each beacon sweeping the X, Y and Z axis. The localization approach can be based on the fact that two planes intersect to form a line and a plane intersects with a line to form a point. This type of "planar" beacon may be generated by using a linear array of n*1 elements in a phased array antenna.

Figure 5A:
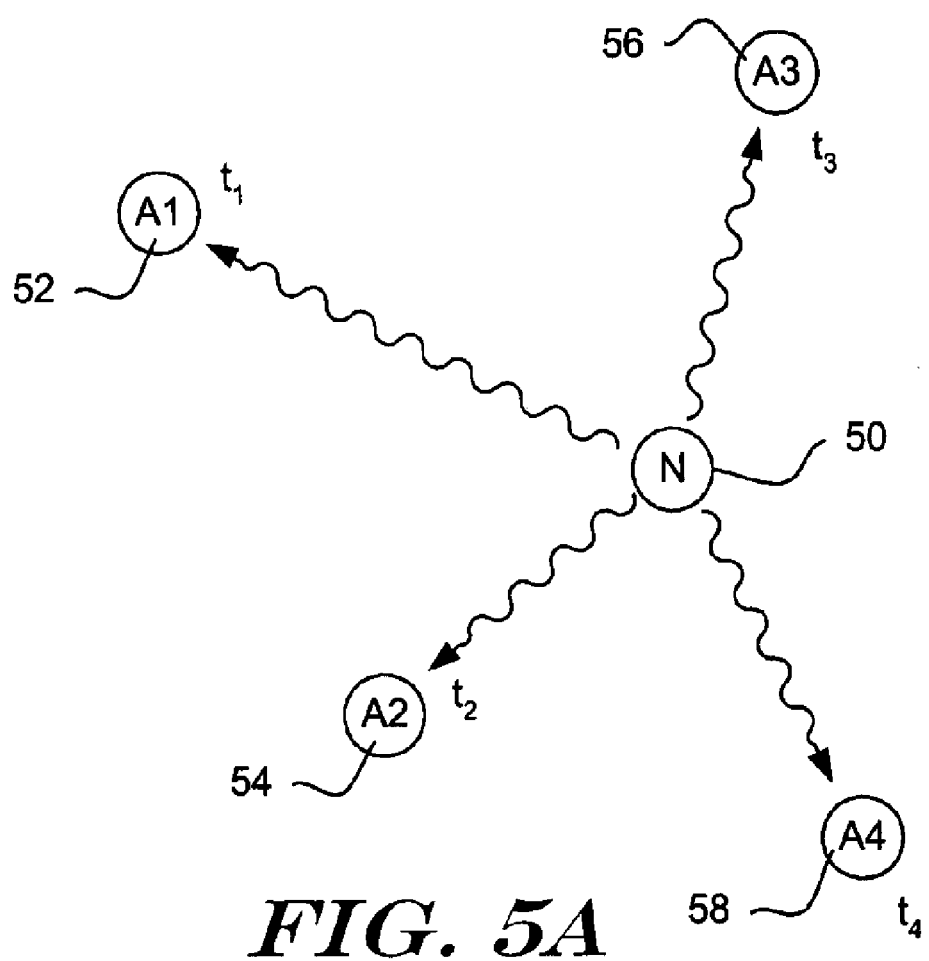
FIGS. 5A-5B illustrate node localization for another illustrative example.
Figure 5B:
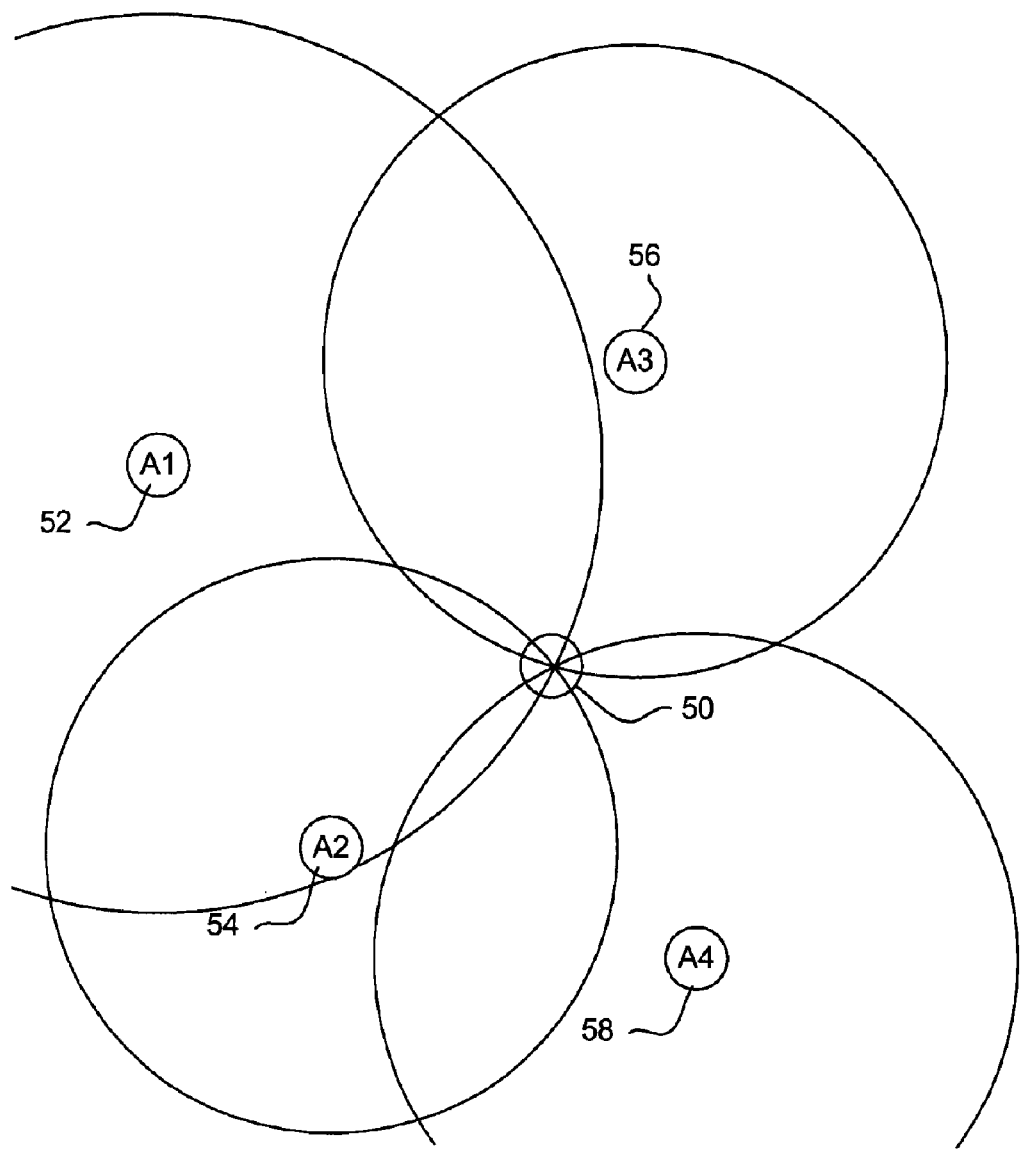

FIGS. 5A-5B illustrate node localization for another illustrative example. In this example, a single pulse or signal from node 50 will arrive at the four shown anchor nodes 52, 54, 56, 58 at four times t1, t2, t3, t4. In an illustrative example, the anchor nodes 52, 54, 56, 58 have highly accurate clocks and are closely synchronized. The relative locations of the anchor nodes 52, 54, 56, 58 are known, for example, from the use of GPS or other location finding approaches. The anchor nodes 52, 54, 56, 58 may be placed at predetermined locations in some instances. The node 50 may have a cheaper and/or less accurate clock, but can still be accurately located in the illustrative example. Specifically, the arrival times of a pulse generated at node 50 and received by nodes 52, 54, 56, and 58, can be used to find the location of the node 50.

For example, an iterative approach of determining the location of node 50, in two dimensions, may include setting up a number of equations and solving each using a variable. Specifically, using the variables t1, t2, t3, t4 as the arrival times, t0 as the signal transmission time, C as the speed with which the transmission travels, values for t0 may be substituted into the following formulae, and graphical or numerical analysis used to determine a likely location for the device 50:

$$d1 = C(t1 - t0)$$

$$d2 = C(t2 - t0)$$

$$d3 = C(t3 - t0)$$

$$d4 = C(t4 - t0)$$

The fourth anchor node is used since the time of sending of the message, t0, is not accurately known. If t0 was accurately known, then only three anchor nodes would be needed, however, this would entail the use of a highly synchronized clock on node 50. If node 50 is a low-cost node, a highly synchronized clock may not be provided. In some examples, node 50 may identify a time of transmission, t0', which may be only loosely or approximately synchronized, and the iterative approach may be performed by beginning with a time estimation within a possible or predefined error range for t0.

Referring to FIG. 5B, calculating the distances d1, d2, d3, d4 can yield the circles shown for each of the anchor nodes 52, 54, 56, 58. When each of the circles intersect (or when the circles come as close to intersecting as they will, depending upon the accuracy desired and the accuracy that the system clocks allow), the location found indicates the location of the node 50. While four anchor nodes 52, 54, 56, 58 are used to find the location in two dimensions in the example of FIGS. 5A-5B, a fifth anchor node may be use to resolve the location of a node 50 in a third dimension.

FIGS. 6A-6D are graphic representations of node generated signals used in some illustrative examples. In a first example, in FIG. 6A, a sinusoidal carrier is clamped from its point of peak amplitude (90 degrees) to its next zero (180 degrees). In another example, in FIG. 6B, the sinusoidal carrier is clamped to zero around its peak amplitude, creating a "notch" in the sinusoidal signal. For example, for a 2.4 GHz carrier signal, the period for the carrier is in the range of 0.4 ns, and the "notch" may be provided with a width in the range of 20 ps. Different ranges and frequencies are also contemplated within the scope of the illustrative example. In yet another example, in FIG. 6C, a notch is again created, this time by clamping the signal to its negative maximum when it would otherwise be at its positive maximum amplitude. FIG. 6D (which is horizontally expanded to better show the signal) shows superposition of a higher frequency monopulse on the sinusoidal carrier. Each of these forms of creating a dramatic, but short-lived, perturbation in the sinusoidal carrier frequency may be used to create a pulse for localization of a node. The portion of the sinusoid that is clamped or otherwise modified may vary as desired.

In another illustrative example, a portion of the carrier signal wave is modified in a manner that contradicts the manner of carrier wave modulation in use. For example, superposition of a signal (FIG. 6D) is inconsistent with an amplitude modulation protocol. Clamping a portion of a carrier signal (FIG. 6A) is inconsistent with a frequency modulation protocol. Any such modification may be considered the provision of a pulse, including each of the formats shown in FIGS. 6A-6D.

FIG. 7 is a block diagram for an illustrative approach of sending a locator pulse. Specifically, the block diagram illustrates parts of a communication that may occur between first and second wireless devices. The communication may include a preamble 84, a message or data portion 86, and a postamble 88. The postamble 88 follows the message 86 and may include data needed for verifying accurate receipt of the message (for example, parity or frame check sequence data). The preamble 84 may include addressing data, information related to the size of the message/data 86, and various other data.

As noted in FIG. 7, in the illustrative example the pulse used in finding the location of a generating node may be located in the postamble 88. A flag may appear in the preamble 84, in the message/data 86, and/or in the postamble 88, with the flag indicating that a locator pulse is coming in the postamble. By placing the locator pulse as part of the postamble 88, circuitry for detecting the locator pulse can be selectively activated/enabled while the communication is occurring, which may improve the ability of receiving devices to detect the clamped signal from among the non-clamped portions. The pulse may be placed in the postamble while the preamble or body of the message indicates which node is sending the message and seeking to be localized.

Figure 8:
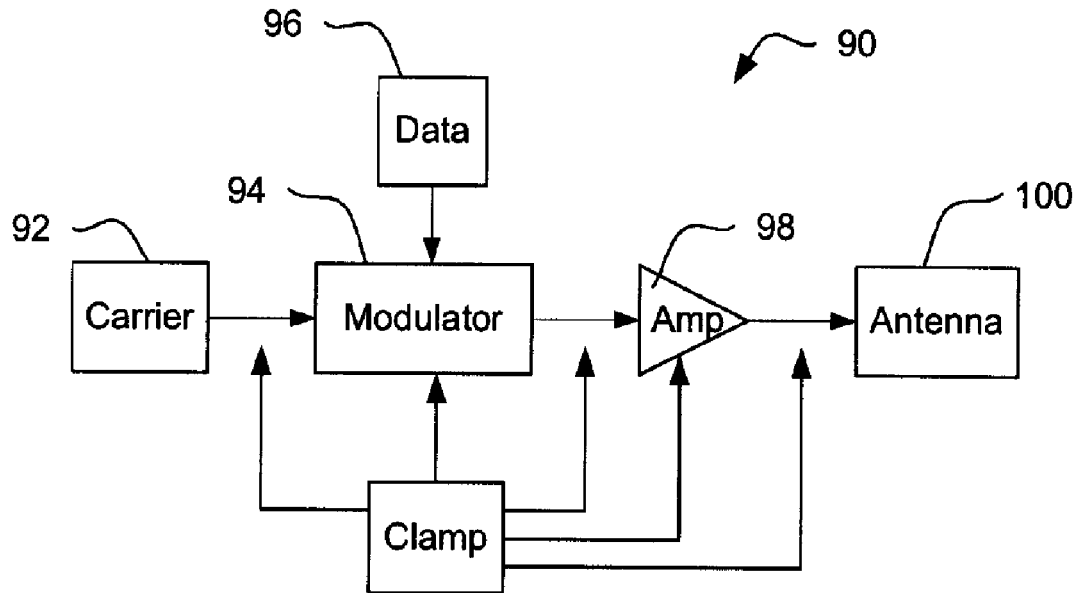
FIG. 8 is a schematic representation for an illustrative distributed node.

FIG. 8 is a partial schematic representation for an illustrative distributed node. The transmitter portion of the illustrative distributed node device is shown. The circuitry 90 includes a carrier generator 92 which may be any suitable circuit for producing a carrier signal (usually a sinusoidal signal) at or about a desired communication frequency. A modulator 94 encodes the signal from the carrier generator 92 using data signals coming from a data generator 96, again using suitable components and approaches for modulating a signal for wireless transmission. The output of the modulator 94 is then amplified using a power amplifier 98, and is distributed to the air using an antenna 100. The power amplifier 98 can take any suitable form, as well as the antenna. It should be noted that in some illustrative examples the antenna 100 need not be a directional antenna as shown above in association with other illustrative examples.

Also shown in FIG. 8 is a clamping circuit 102. The clamping circuit 102 is used to clamp a portion of the carrier signal. This may be performed, as shown, on the signal as it comes from the carrier generator 92, as a part of the modulator 94, on the signal coming out of the modulator 94, or by disabling the amplifier 98. The clamp 102 may also operate on the signal coming from the power amplifier 98 just before the signal goes to the antenna 100. In some instances, the clamp 102 comprises an analog device having a high speed switch coupled to a reference voltage or ground. For example, the clamp 102 may include sense circuitry for sensing a portion of the carrier signal and, when enabled, the clamp 102 may operate to sense a part of the carrier signal (a peak, a highest slope point, or a zero crossing, for example) and close a switch, clamping the sensed signal for a predetermined period of time or amount of the phase of the carrier signal. Rather than clamping the sensed (carrier) signal, the clamp 102 may be replaced by a pulse circuit that provides a pulse for superposition over the carrier signal, with the pulse being of a different form/shape than would normally be part of the carrier modulation.

In another example, the clamp 102 is coupled to a first location to sense the signal before it reaches the power amplifier 98, but operates to clamp the signal coming out of the power amplifier 98. In this way, operation of the clamp 102 may sense the carrier signal and use the periodicity of the carrier signal to determine how long to clamp the signal. Since the device 90 may be adapted to operate on different channels or using varying output frequencies, such an adaptive clamp 102 may prove useful.

In yet another example, the clamp 102 is coupled to digital logic from a device controller and clamps the signal for a predetermined, yet relatively short (between a fraction of a cycle up to a few cycles of the carrier signal) period of time.

In addition to the above discussion, rather than clamping the sensed (carrier) signal, the clamp 102 may be replaced by a pulse circuit that provides a pulse for superposition over the carrier signal, with the pulse being of a different form/shape than would normally be part of the carrier modulation. In another illustrative example, multiple pulses may be applied within a time zone defined in the postamble where information about the relative time locations of the pulses is first coded within the structure of the pulses. This may provide additional opportunities for the receiving devices to detect one or more of the pulses successfully.

Figure 9:
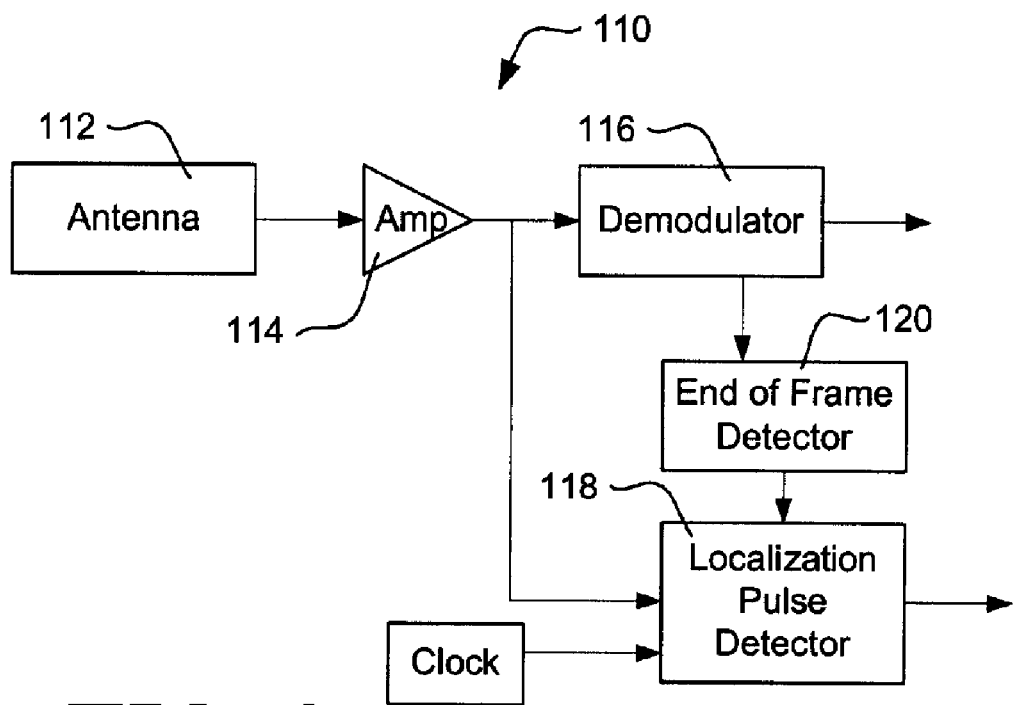
FIG. 9 is a schematic representation for an illustrative anchor node.

FIG. 9 is a partial schematic representation for an illustrative anchor node. The portion of the anchor node 110 used for receiving signals is shown. Specifically, signal is captured with an antenna 112. The signal from the antenna 112 is then amplified using a power amplifier 114, and passed to a demodulator 116 to extract data from the received signal.

These portions of the circuit may take a variety of known forms, using various known approaches.

The anchor node 110 further includes a localization pulse detector 118. The localization pulse detector 118 may include circuitry adapted to observe the sinusoidal nature of received signal and identify when a localization pulse appears on the carrier or sinusoid. In some cases, the localization pulse detector 118 may include its own independent antenna or amplifier, separate from antenna 112 or amplifier 114. As shown in FIG. 6, the localization pulse 82 may be embodied in a departure from sinusoidal signal. For example, the signal is clamped for a period of time. In some instances the localization pulse detector 118 is coupled to a system clock that is closely synchronized to system clocks for other anchor nodes. Using high speed devices in the localization pulse detector 118, the relative time of arrival for the localization pulse 82 (FIGS. 6A-6D) can then be determined.

In some examples, the circuitry further includes an end-of-frame detector 120 that determines when a data frame is about to end. The end-of-frame detector may then provide a signal to the localization pulse detector 118 identifying the time in the message where the one or more localization pulses may to be found.

Figure 10:
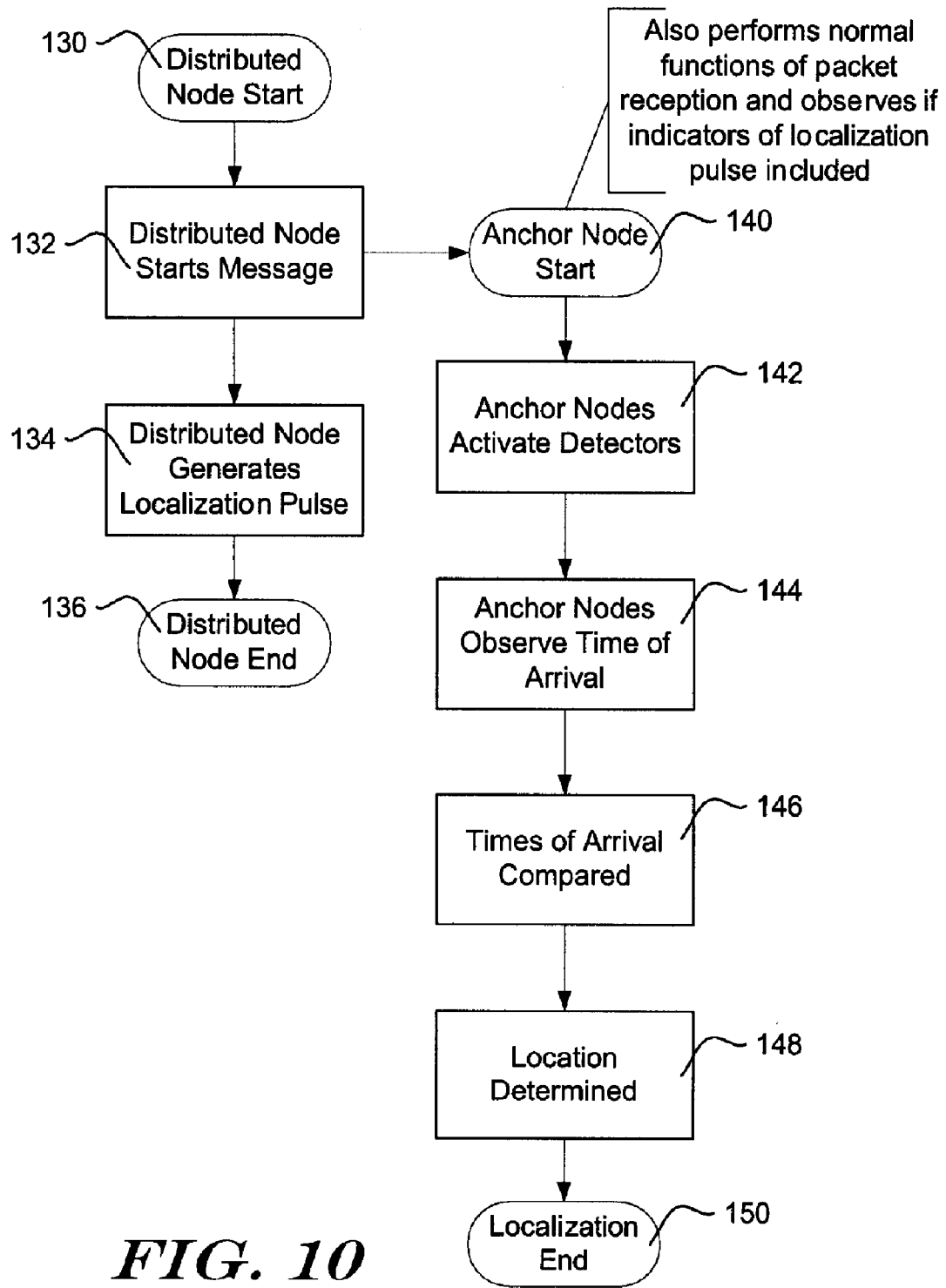
FIG. 10 is a block diagram for an illustrative approach.

FIG. 10 is a block diagram for an illustrative approach. Operations by a distributed node and an anchor node are shown separately in FIG. 10. From a start block 130, the distributed node begins generating a message (which may include the distributed nodes source address), as shown at 132. As a part of the message, for instance, in the postamble of the message, the distributed node then generates a localization pulse, as shown at 134. This may end the distributed node's part in the localization process, as shown at 136, unless the distributed node performs later calculations to actually determine its location.

As indicated by the arrow, the anchor node may start its portion of the localization approach while the distributed node is generating a message, as shown at 140. The anchor node(s) may proceed with normal packet reception including observation of the source address, observing for indicators that may be in the data portion of the message (or preamble or elsewhere) specifying whether a timing pulse will be included and locating the beginning of the postamble to begin searching for the timing pulse. The anchor nodes activate respective localization pulse detectors, as shown at 142, if necessary. In some examples, the localization pulse detector circuitry may be always-on, and does not need activation. Generating a signal that identifies the beginning of the postamble and/or indicating that one or more localization pulses are coming may improve the likelihood that the one or more localization pulses will be correctly detected and their time of arrival will be accurately measured. The anchor nodes then note the time of arrival of the localization pulse, as shown at 144. Then, the times of arrival for three or more anchor nodes are compared, as shown at 146. The location of the distributed node is then determined, as shown at 148, by comparing the time of arrival to the times of arrival at other anchor nodes for packets received with the same source address. The approach ends as noted at 150.

The comparison and determination steps 146, 148 may be performed by any node having the computational capacity for such steps. For example, one of the anchor nodes may gather data related to the localization pulse times of arrival from other anchor nodes and perform the comparison and determination steps 146, 148. In another illustrative example, the distributed node receives timing information back from the anchor nodes in response to the localization pulse and performs the comparison and determination steps 146, 148.

In yet another example, the times of arrival data may be transmitted to yet another node for performing the comparison and determination steps 146, 148. For instance, a wireless network may include a particular node used for mapping out of communication routes within the system. This node may be a dedicated node, or it may perform other functions and simply include extra functionality for performing steps 146 148. In another example, the wireless system may include a gateway or base node that performs steps 146, 148, or the gateway or base node may transmit the localization information to an out-of-network device.

Figure 11:
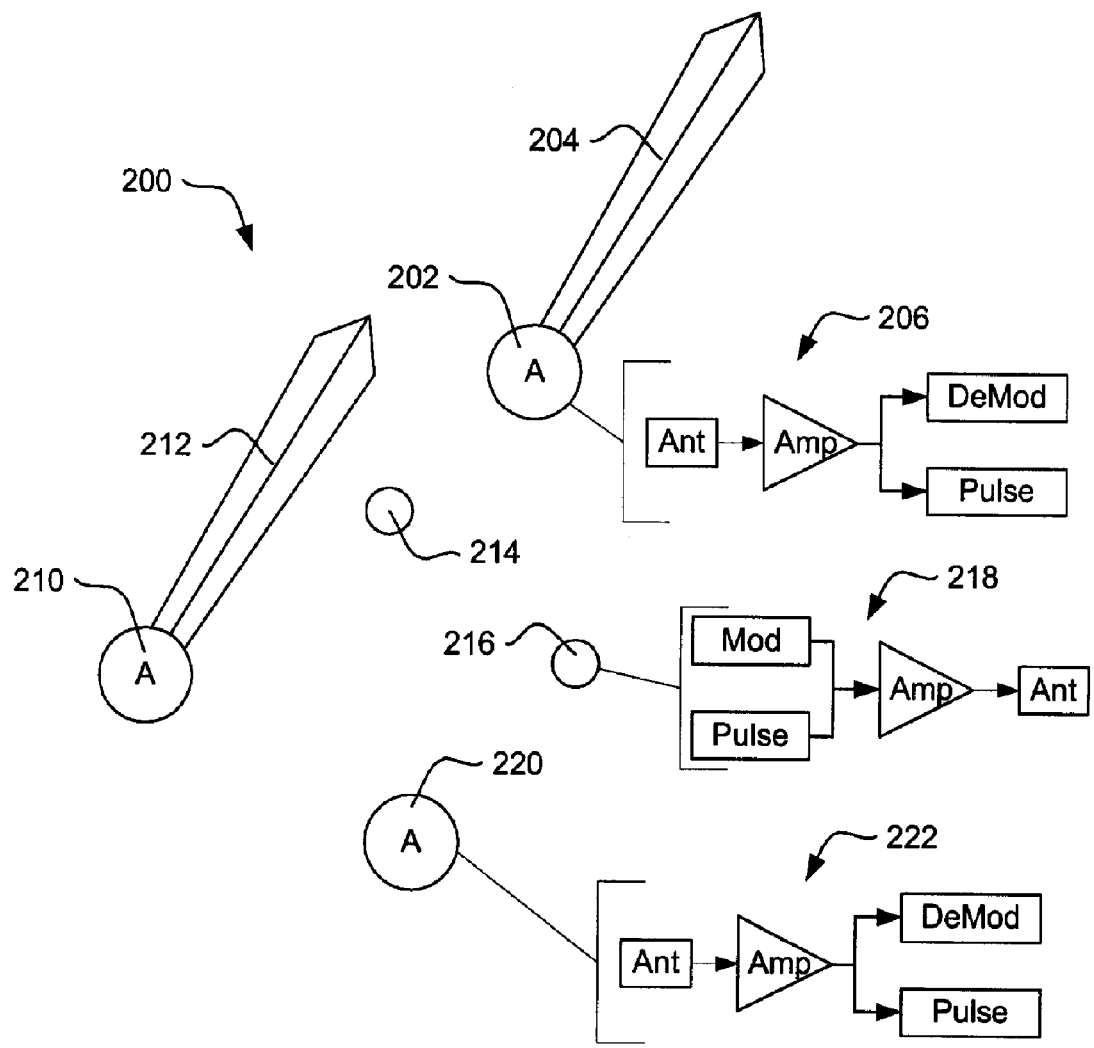
FIG. 11 illustrates a combination system.

FIG. 11 illustrates a combination system. The system creates localization redundancy and hence flexibility, as well as likely allowing for better accuracy. The system 200 may include a number of anchor nodes and a number of distributed nodes. A first anchor node 202 is shown as capable of producing a directional beacon 204 in accordance with the illustrative examples shown above in FIGS. 2, 3A-3B, and 4. The first anchor node 202 is also capable of receiving a pulse output, as shown by the circuitry at 206, for localization in accordance with the examples of FIGS. 5A-5B, and 6-10. A second anchor node 210 is shown as including apparatus capable of providing a directional beacon 210, but may or may not include the pulse detection circuitry. A first distributed node 214 is illustrated as a basic node having directional beacon reception capabilities, and may or may not include pulse generation circuitry. A second distributed node 216 includes pulse generation circuitry as shown at 218, but need not be capable of receiving messages. A third anchor node 220 includes the pulse detection circuitry, as shown at 222, but may or may not include directional signal capabilities.

As can be seen in FIG. 11, there are various combinations available. In some instances, a "dummy" distributed node can generate a localization pulse as part of a message it generates according, for example, to a schedule, though the dummy distributed node may lack message reception circuitry/capability. The system may also include an anchor node with the task of keeping other anchor nodes in accurate time synchronization. Use of anchor nodes such as anchor node 202, having both directional output 204 and pulse detection circuitry 206 may allow flexibility in the kind of distributed nodes 214, 216 that are compatible with the system. Alternatively, use of distributed nodes having both reception and pulse generation circuitry 218 allows different anchor nodes to be used as well.

In another use of the combination, a single node 216 may be localized using both a pulsed time of arrival approach as well as a directional approach such that two anchor nodes having the capabilities of node 202 may estimate a position of a single node 216 in three dimensions. For example, defining a coordinate system having an axis passing from a first anchor node to a second anchor node, the directional approaches herein can use two anchor nodes to find a line on which a distributed node must lie. If the anchor nodes produce directional outputs having central lobes that may be characterized as generally planar in three dimensions, the line on which the distributed node must lie is the intersections of the planar outputs. The intersection(s) of this line with the shape of possible locations for the distributed node that can be determined, in three dimensions, using the pulse approach, will provide a limited number of possible locations for the distributed node.

In yet another use combination, the directional antenna in anchor node 202 may be used as a receiving antenna, rather than sending, with element 204 indicating a swath of greater antenna sensitivity. Signals generated within the antenna focus area 204 will be received at higher amplitude, while signals generated elsewhere may not be sensed. In some instances, the anchor node 202 may have plural antennae, with one antenna used to receive a localization pulse, while the directional antenna is used during data transfer from a node to be located, such as node 216, to observe the direction that the localization pulse is coming from. In this manner, a direction and range for the device 216, with respect to device 202, may be determined by device 202, itself. This information may be used to reduce the number of anchor nodes needed for localizing a given node.

In yet additional illustrative examples, a combination of pulsed and directional beacon localization may enable anchor nodes to observe clock characteristics of a node being localized. For example, if a distributed node generates a pulse signal and indicates the time of transmission relative to a synchronization time, the anchor nodes may use the pulse signal and/or directional beacon-based localization data to determine, according to the highly synchronized anchor node clocks, when the distributed node generated the pulse signal. The calculated time of transmission may be compared to the time indicated by the distributed node to observe the accuracy of the distributed node clock. Such data may in turn be used to trouble-shoot a system in which a communications schedule is used to move data.

In a combination example, the directional antenna of certain anchor nodes enables distributed nodes to identify their own location from the directional data packets transmitted by the anchor nodes, but without any specific bidirectional communication with the particular anchor nodes. Analogously, pulse-based approaches allow the anchor nodes to identify the location of distributed nodes without any further specific communication with them. The combination example allows location identification throughout a system without specific bidirectional communication between at least some of the pairs of devices that would, in some older approaches, need to establish bi-directional communication.

It should be noted that one of the physical limitations to the directional beacon approaches is that, as the directional beacon propagates, it tends to spread, making localization at greater distances less likely to be highly accurate for the directional beacon approach. Within an environment in which clusters occur or where several networks are distributed from one another, pulse approaches may be used to observe positions of devices in other clusters or networks, while directional approaches may be used to observe locations within a local network or cluster of devices. With this in mind, another illustrative example performs a first estimate of location using one of the directional or pulse approaches, and subsequently determines which approach is better suited to providing a best estimate of location.

In yet another example, a system of existing anchor nodes is used to initialize a new anchor node by the use of one or both of the directional and pulse-based approaches of determining node location. In such an example, the new anchor node is adapted to perform the functions of a distributed node for at least one of the directional and/or pulse-based approaches of determining node location. In one such example, localization may be performed using a directional approach for the new anchor node in order to provide verification of node locations for several anchor nodes in the system including the new anchor node. For example, if the new node has a location that is determined by the use of a time of arrival approach, a directional approach may be used to verify the new node location as well as determining whether there may be inaccuracies in the position information related to other anchor nodes.

Another illustrative example includes a system for localization in a wireless sensor network having a plurality of wireless nodes adapted to transceiver wireless signals. The illustrative network comprises a plurality of anchor nodes adapted to be configured with reference positional information, the anchor nodes having at least one directional antenna to broadcast positional information through at least one unidirectional wireless signal path, and a plurality of sensor nodes equipped with wireless transceivers for communication, the sensor nodes including a processor configured to capture directional and location information from at least two anchor nodes for determining the location of the sensor nodes. The system may further comprise a central processor for receiving data related to captured directional and location information from the sensor nodes and determine the location of the sensor nodes. In another example, the sensor nodes may be adapted to determine their position with reference to the anchor nodes from captured directional and location information.

In some instances of the pulse-based approaches, the one or more pulses may be proved at locations other than the postamble. While an advantage of the postamble use is that the message will have already undergone a FCS (frame check sequence) and the receiving devices will already be aware that the message is a good message, this does not necessarily limit the present invention to providing the pulse at that location. There are other suitable locations in a message that may also be used. Some examples include, for example, the end of the preamble, just after the start of the frame delimiter, or elsewhere. The pulse may be provided at a location generally within a data portion of the message as well. In some examples, the pulse is provided at a location in the message where the carrier has a constant format. For example, the receiving device demodulator may, prior to and during pulse delivery, see a series of zeroes or ones, rather than a changing signal. This may also be one form of providing an indication that the localization is about to be received, as in, the demodulator may output "n" series of zeroes or ones, with the localization pulse appearing in one or more of the series. Of course, more may need to be known to indicate when the appropriate series of demodulator outputs will begin. Those of skill in the art will understand that there are a number of ways to provide such indicators, as well as a plurality of locations within a message that are suitable for providing a localization pulse.

Yet another combination example is one in which the pulse localization instances for anchor nodes and/or distributed nodes are included in a system which also includes an anchor node having directional signal capture. The system may include an anchor node that includes a directional antenna capable of preferential signal capture along a first direction. In such an example, the directional anchor node is adapted to cause the directional antenna to change the direction of the preferential signal capture, the second anchor node being adapted to determine a direction from which a received signal is generated. For this example, the source location for the pulsed output may also be determined with reference to the directional antenna reception. This data may be combined, again, with data from the pulsed output examples to further improve system accuracy, reliability, or flexibility.

In the present specification, some or the matter may be of a hypothetical or prophetic nature although stated in another manner or tense.

Further, although the invention has been described with respect to a least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method of determining the location of a wireless device, the method comprising:
   providing a wireless device and a plurality of anchor nodes, the anchor nodes having known locations and a synchronized sense of time;
   generating a message from the wireless device, wherein the message is generated using a carrier signal that is modulated according to a predetermined modulation communication protocol in conjunction with data for transmission, the message including a modulated signal having a modulated preamble, a modulated data portion, and a modulated postamble;
   during at least one of the modulated preamble, the modulated data portion, and the modulated postamble, providing at least one timing pulse in the modulated signal making up the message from the wireless device;
   receiving the message that includes the timing pulse at more than one of the plurality of anchor nodes; and
   comparing the times at which the more than one anchor nodes received the timing pulse in the modulated signal making up the message.

2. The method of claim 1 wherein the anchor nodes determine which of a plurality of devices generated the at least one pulse by observing a portion of the message including source address data.

3. The method of claim 1 wherein the more than one anchor node includes first, second, third and fourth anchor nodes.

4. The method of claim 1 wherein the at least one timing pulse is provided in the modulated signal making up the message in a manner that is inconsistent with the predetermined modulation communication protocol.

5. The method of claim 1 wherein the at least one timing pulse is provided in the modulated postamble and the message includes an indication that the at least one timing pulse will occur in the modulated postamble.

6. The method of claim 5 wherein at least one of the anchor nodes includes a locator circuit adapted to observe the time of receipt of the at least one timing pulse, wherein the method includes activating the locator circuit during a time corresponding to an expected time that the at least one timing pulse will be received.

7. The method of claim 1 further comprising:
   providing another device having a known location, the another device including a directional antenna;
   capturing a signal generated with the directional antenna; and
   determining the direction of greatest sensitivity of the directional antenna at the time the signal from the wireless device is captured.

8. The method of claim 7 further comprising combining directional information from the another device and pulse time of arrival information from the anchor devices to determine the location of the wireless device.

9. The method of claim 1 further comprising:
   providing another device having a known location, the another device including a directional antenna;
   generating a directional signal from the directional antenna, the signal including data related to a direction the antenna is pointing at a given time and data related to the another device; and
   capturing the directional signal with the wireless device.

10. The method of claim 9 further comprising the wireless device determining its location using data from the captured directional signal.

11. A wireless device comprising generating circuitry that generates a carrier signal, and modulating circuitry that modulates the carrier signal relative to data for transmission in accordance with a predetermined modulation communication protocol to generate a signal for transmission, the device further comprising pulse creation circuitry adapted to selectively create one or more pulses in association with the signal for transmission, the one or more pulses being generated and applied in a manner inconsistent with the predetermined modulation communication protocol associated with modulation of the carrier signal by the modulating circuitry, resulting in one or more pulses disposed in the signal for transmission.

12. The wireless device of claim 11 wherein the device is configured to create a message by use of the circuitry for generating and the circuitry for modulating, wherein the device also comprises a controller that controls the pulse creation circuitry and selectively causes the carrier signal to be modified inconsistent with the predetermined modulation communication protocol during a designated portion of a selected message, the selected message also including source identifier data.

13. The wireless device of claim 12 wherein the pulse creation circuitry clamps a portion of the carrier signal.

14. A wireless communication system comprising:
   a wireless device as in claim 11; and
   a plurality of anchor nodes, wherein a first anchor node comprises circuitry for communicating wirelessly with the wireless device of claim 11, the first anchor node further comprising pulse detection circuitry for detecting when the one or more pulses are received at the first anchor node.

15. The system of claim 14 wherein the first anchor node includes an antenna coupled via amplification circuitry to a demodulator, wherein the pulse detection circuitry takes an output from the amplification circuitry that couples the antenna to the demodulator.

16. The system of claim 14 wherein the first anchor node includes an antenna coupled via signal amplification circuitry to a demodulator, wherein the pulse detection circuitry takes an output from separate amplification circuitry different from the signal amplification circuitry.

17. The system of claim 14 wherein the pulse detection circuitry of the first anchor node is configured to receive a pulse generated when the wireless device selectively causes the carrier signal to be modified inconsistent with the predetermined modulation communication protocol.

18. The system of claim 14 further comprising a second anchor node that includes a directional antenna capable of preferential signal capture along a first direction, the second anchor node configured to cause the directional antenna to change the direction of the preferential signal capture, the second anchor node being configured to determine a direction from which a received signal is generated.

19. The system of claim 14 wherein a second anchor node includes a directional antenna capable of generating a directional signal such that the directional signal, when directed from the second anchor node in a first direction, generates data as part of the directional signal indicative of the first direction.

20. The system of claim 19 wherein the wireless device is further configured to receive the directional signal and determine its direction with respect to the second anchor node.

21. A wireless communication system comprising:
a wireless device as in claim 11; and
a plurality of anchor nodes having known locations, a first of the anchor nodes configured to receive a pulse from the wireless device and determine a time of reception, and a second of the anchor nodes adapted to produce directional output signals, the directional output signals including indicators of relative direction of the directional output signal at a given time;
such that the wireless communication system includes devices adapted for both directional and pulse-based localization of devices therein.

22. A wireless communication system comprising:
a first anchor node configured to receive a data transmission from a distributed node using at least a first predetermined modulation communication protocol, the first anchor node having a sense of time synchronization and known locations with reference to a second node, the first anchor node being configured to observe, in at least some data transmissions modulated with the first predetermined modulation communication protocol, one or more pulses created by modification of a carrier in a manner that is inconsistent with the first predetermined modulation communication protocol;
a second anchor node having a known location and a directional antenna;
wherein the wireless communication system is configured to perform localization of distributed nodes therein by the use of a time of arrival method for at least some distributed nodes and a directional method for at least some other distributed nodes.

23. The system of claim 22 wherein the wireless communication system is configured to perform localization of at least some distributed nodes using a combination of directional and time of arrival data.

24. The system of claim 22 wherein the second anchor node is configured to generate a directional transmission containing information related to the identification of the second anchor node and the direction of transmission.

25. The system of claim 22 wherein the second anchor node is adapted to receive a transmission containing identification of a distributed node and determine the direction from which the transmission is received.

26. The system of claim 22 wherein the first anchor node is further adapted to expect the one or more pulses during a designated portion of message transmission.

* * * * *

UNITED STATES PATENT AND TRADEMARK OFFICE
CERTIFICATE OF CORRECTION

PATENT NO.      : 7,603,129 B2  
APPLICATION NO. : 11/163105  
DATED           : October 13, 2009  
INVENTOR(S)     : Gonia et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Fifth Day of October, 2010

David J. Kappos  
*Director of the United States Patent and Trademark Office*